United States Patent
Lee

[11] Patent Number: 6,134,027
[45] Date of Patent: Oct. 17, 2000

[54] METHOD AND DEVICE FOR DETERMINING SCANNING DIMENSION

[75] Inventor: Corl Lee, Hsinchu, Taiwan

[73] Assignee: Mustek Systems, Inc., Hsinchu, Taiwan

[21] Appl. No.: 08/956,897

[22] Filed: Oct. 23, 1997

[51] Int. Cl.[7] .............................. H04N 1/04; H04N 1/40
[52] U.S. Cl. ..................... 358/474; 358/449; 358/488; 399/370; 399/376
[58] Field of Search ..................................... 358/486–488, 358/497, 474, 449; 399/370, 376; 348/96–98; 356/383, 384–387; 250/559.24, 559.26

[56] References Cited

U.S. PATENT DOCUMENTS

| | | | |
|---|---|---|---|
| 5,072,311 | 12/1991 | Hiramatsu et al. | 358/488 |
| 5,198,853 | 3/1993 | Ichihara et al. | 358/488 |
| 5,202,556 | 4/1993 | Kawabata et al. | 358/488 |
| 5,327,261 | 7/1994 | Hirota et al. | 358/449 |
| 5,384,621 | 1/1995 | Hatch et al. | 355/204 |

*Primary Examiner*—Kimberly A. Williams
*Attorney, Agent, or Firm*—Knobbe, Martens, Olson & Bear, LLP

[57] ABSTRACT

A method and a device are provided for determining a scanning dimension of a scanned body. The device includes a light source, a detecting unit, and a signal processing unit. The method includes steps of (a) providing an initial optical signal, (b) receiving the initial optical signal and generating an initial detecting signal in response to the initial optical signal, (c) receiving the initial optical signal and generating a complex detecting signal according to the scanning dimension of the scanned body, and (d) determining the scanning dimension of the scanned body by calculating the initial detecting signal and the complex detecting signal.

10 Claims, 11 Drawing Sheets

METHOD AND DEVICE FOR DETERMINING SCANNING DIMENSION

FIELD OF THE INVENTION

The present invention is related to a method and a device for determining a scanning dimension of a scanned body, and more particularly to a method and a device for determining the width and the length of a scanned body.

BACKGROUND OF THE INVENTION

When an existent scanner scans a piece of paper, the scanning area is predetermined by the position and size of an adjustable tray. Therefore, the paper must be put in the correct position so it can be scanned properly. If the paper is not put properly, the boundary of the paper outsteps the region of the adjustable tray, and a portion of the gotten image is cut off, even though the size of the paper is not larger than the adjustable tray. On the other hand, if the size of the paper is much smaller, it is unwise to convert so many electronic signals into an image picture and then cut the unwanted margin which, however, needs to occupy some memory space. Accordingly, a sensor is conventionally added to detect the position of the paper, but the prior art has the following disadvantages.

1. Assembling parts into a scanner introduces errors in the relative positions of the elements. Although the piece of paper is put in the stated position, the image still shifts. So we must adjust the position of the piece of paper to be scanned again.

2. After detecting the position of the piece of paper, the position of the charge coupled device will be adjusted and unavoidable errors between elements generate. The long adjusting time is also a trouble.

SUMMARY OF THE INVENTION

An objective of the present invention is to provide a method for determining, through detecting the boundary of a scanned body automatically and precisely, a scanning dimension of the scanned body.

Another objective of the present invention is to provide a device for determining, through detecting the boundary of a scanned body automatically and precisely, a scanning dimension of the scanned body.

In accordance with the present invention, a method for determining a scanning dimension of a scanned body includes steps of (a) providing an initial optical signal, (b) receiving the initial optical signal and generating an initial detecting signal in response to the initial optical signal, (c) receiving the initial optical signal and generating a complex detecting signal according to the scanning dimension of the scanned body, and (d) determining the scanning dimension of the scanned body by calculating the initial detecting signal and the complex detecting signal.

In accordance with another aspect of the present invention, the initial optical signal is certainly provided by a light source.

In accordance with another aspect of the present invention, the step (b) is executed by a detecting unit which has a plurality of strias thereon.

In accordance with another aspect of the present invention, the complex detecting signal includes a first detecting signal and a scan optical signal.

In accordance with another aspect of the present invention, the scanned body receives the initial optical signal and generates the scan optical signal while the detecting unit receives the initial optical signal and generates the first detecting signal.

In accordance with another aspect of the present invention, the scanning dimension of the scanned body can be a width of the scanned body which has a first width boundary and a second opposite width boundary, wherein the width boundaries are preferably in parallel to the plurality of strias of the detecting unit.

In accordance with another aspect of the present invention, the first width boundary of the scanned body is preferably in alignment with an end of the detecting unit and the second opposite width boundary of the scanned body is in alignment with a specific one of the strias of the detecting unit.

In accordance with another aspect of the present invention, the width of the scanned body is determined according to the specific one of the strias of the detecting unit by calculating the complex detecting signal.

In accordance with another aspect of the present invention, the first width boundary of the scanned body is preferably in alignment with a first specific one of the strias of the detecting unit and the second opposite width boundary of the scanned body is in alignment with a second specific one of the strias of the detecting unit.

In accordance with another aspect of the present invention, the width of the scanned body is determined according to the first specific one of the strias of the detecting unit and the second specific one of the strias of the detecting unit by calculating the complex detecting signal.

In accordance with another aspect of the present invention, the scanning dimension of the scanned body can be a length of the scanned body which has a first length boundary and a second opposite length boundary, wherein the length boundaries are preferably normal to the plurality of strias of the detecting unit.

In accordance with another aspect of the present invention, after the step c), a step of c1) is further included to receive the initial optical signal and generate, by the detecting unit, another initial detecting signal in response to the initial optical signal.

In accordance with another aspect of the present invention, the step b) is executed before a first specific time when the first length boundary of the scanned body receives the initial optical signal.

In accordance with another aspect of the present invention, the step c) is executed after the first specific time and before a second specific time when the second opposite length boundary of the scanned body receives the initial optical signal.

In accordance with another aspect of the present invention, the step c1) is executed after the second specific time.

In accordance with another aspect of the present invention, the length of the scanned body is determined according to the first specific time and the second specific time by calculating the initial detecting signal and the complex detecting signal.

In accordance with another aspect of the present invention, the step d) is preferably executed by a signal processing unit.

In accordance with the present invention, a device for determining a scanning dimension of a scanned body includes a light source for providing an initial optical signal, a detecting unit for generating an initial detecting signal in response to the initial optical signal and a complex detecting signal according to the scanning dimension of the scanned body, and a signal processing unit for determining the scanning dimension of the scanned body by calculating the initial detecting signal and the complex detecting signal.

In accordance with another aspect of the present invention, the detecting unit has a plurality of strias thereon.

In accordance with another aspect of the present invention, the detecting unit preferably has a stripy pattern.

In accordance with another aspect of the present invention, the detecting unit is preferably a grating.

In accordance with another aspect of the present invention, the detecting unit is certainly mounted in a light path of the initial optical signal.

In accordance with another aspect of the present invention, the scanning dimension of the scanned body can be a width of the scanned body which has a first width boundary and a second opposite width boundary, wherein the width boundaries are preferably in parallel to the plurality of strias of the detecting unit.

In accordance with another aspect of the present invention, the first width boundary of the scanned body is in alignment with a first specific one of the strias of the detecting unit and the second opposite width boundary of the scanned body is in alignment with a second specific one of the strias of the detecting unit.

In accordance with another aspect of the present invention, the signal processing unit determines the width of the scanned body according to the first specific one of the strias of the detecting unit and the second specific one of the strias of the detecting unit by calculating the complex detecting signal.

In accordance with another aspect of the present invention, the device preferably includes a fixed bar mounted on an end of the detecting unit for aligning the first width boundary of the scanned body, while second opposite width boundary is in alignment with a specific one of the strias of the detecting unit.

In accordance with another aspect of the present invention, the signal processing unit determines the width of the scanned body according to the specific one of the strias of the detecting unit by calculating the complex detecting signal.

In accordance with another aspect of the present invention, the scanning dimension of the scanned body can be a length of the scanned body which has a first length boundary and a second opposite length boundary, wherein the length boundaries are preferably normal to the plurality of strias of the detecting unit.

In accordance with another aspect of the present invention, the detecting unit generates the initial detecting signal in response to the initial optical signal before a first specific time when the first length boundary receives the initial optical signal.

In accordance with another aspect of the present invention, the scanned body and the detecting unit generate the complex signal in response to the initial optical signal after the first specific time and before a second specific time when the second opposite length boundary receives the initial optical signal.

In accordance with another aspect of the present invention, the detecting unit generates another initial detecting signal in response to the initial optical signal after the second specific time.

In accordance with another aspect of the present invention, the signal processing unit determines the length of the scanned body according to the first specific time and the second specific time by calculating from the complex detecting signal and the initial detecting signal.

In accordance with another aspect of the present invention, the device further includes a light-reflecting unit for changing the light paths for the initial detecting signal and the complex detecting signal.

In accordance with another aspect of the present invention, the signal processing unit further includes a charge coupled device for converting the initial detecting signal and the complex detecting signal into voltage level signals.

In accordance with another aspect of the present invention, the device further includes an image processing unit electrically connected to the charge coupled device for converting the voltage level signals into an image signal.

In accordance with another aspect of the present invention, the image processing unit is preferably a circuit.

In accordance with another aspect of the present invention, the image processing unit is preferably a software program.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
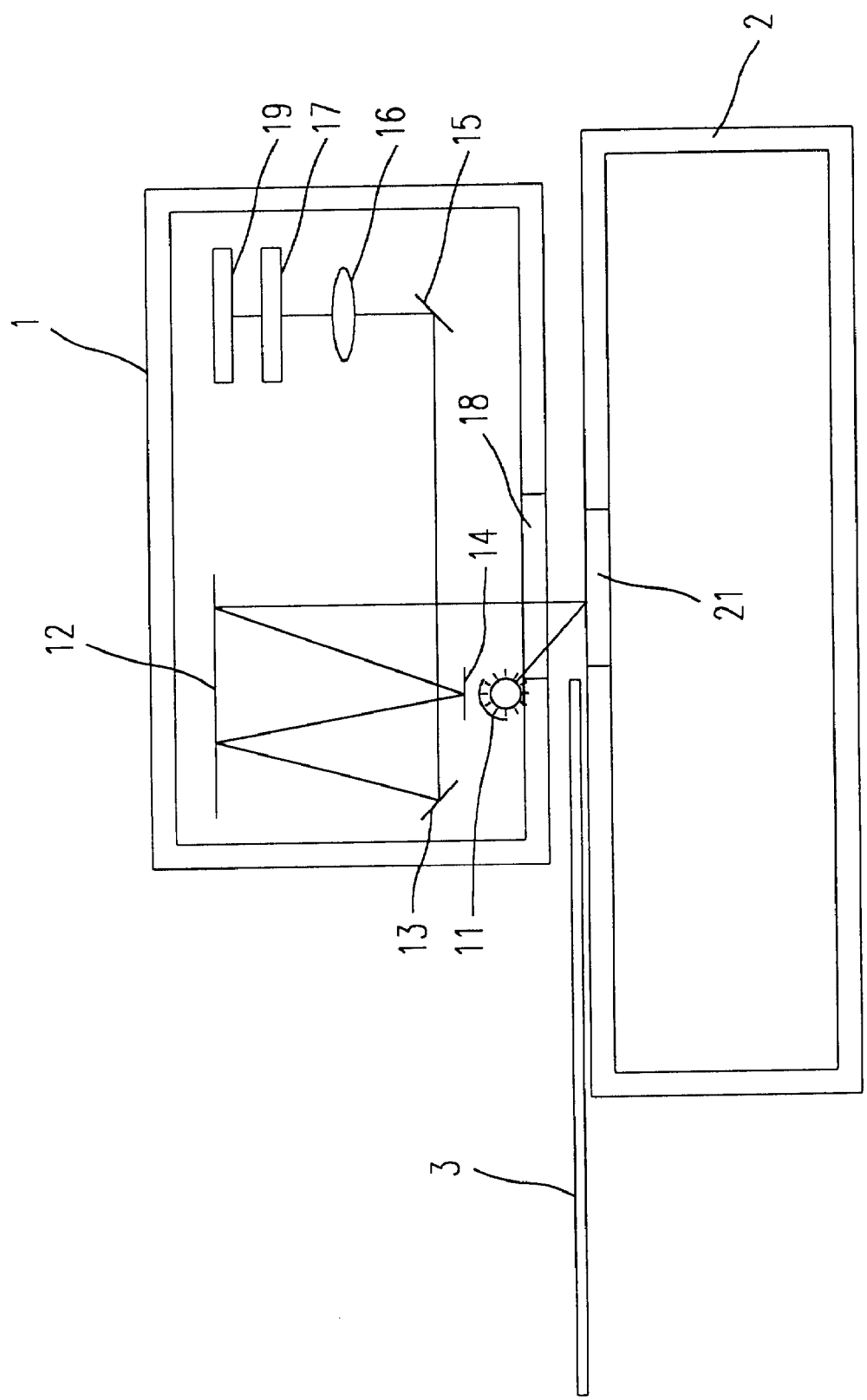
FIG. 1 is a side view showing the structure of a sheetfed scanner according to the present invention.
Figure 2A:
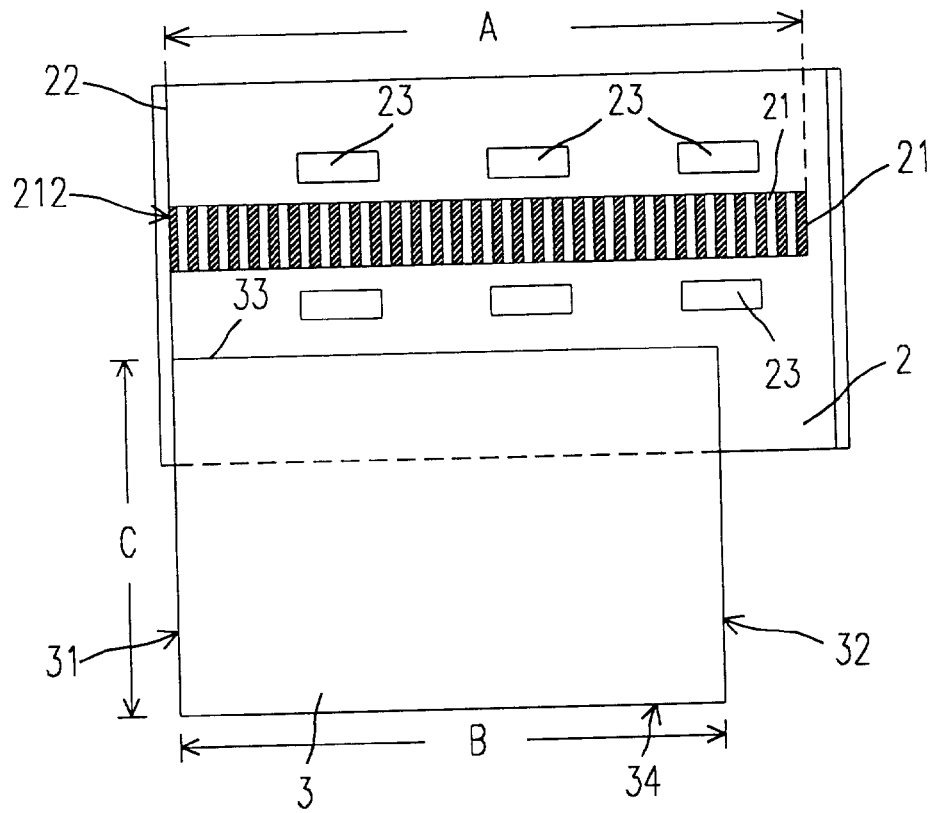
FIGS. 2 (a)–(e) are schematic diagrams showing a preferred embodiment for determining the width and the length of the scanned body according to the present invention.
Figure 2B:
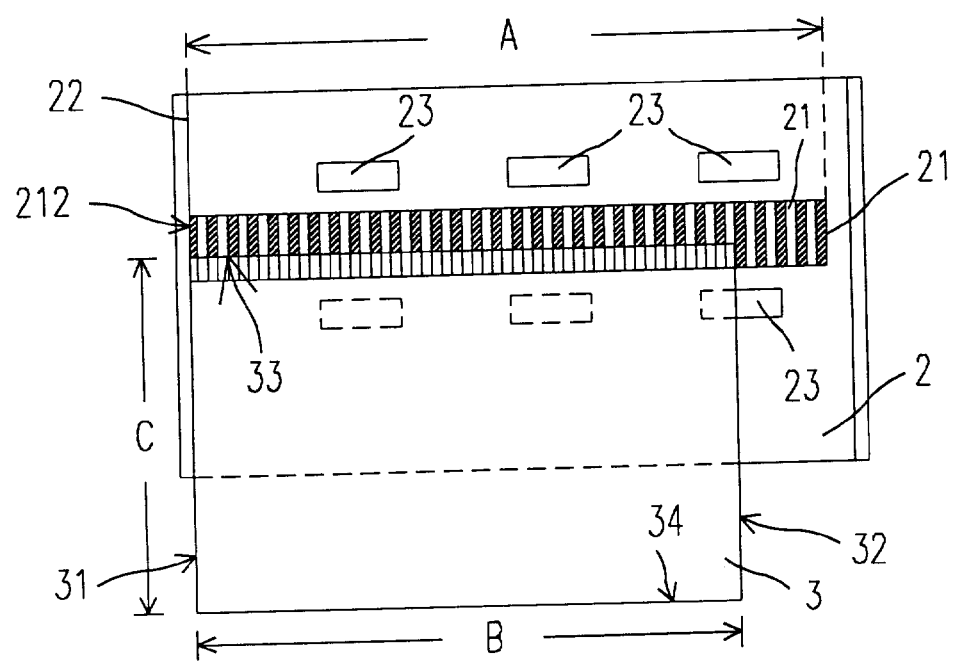
Figure 2C:
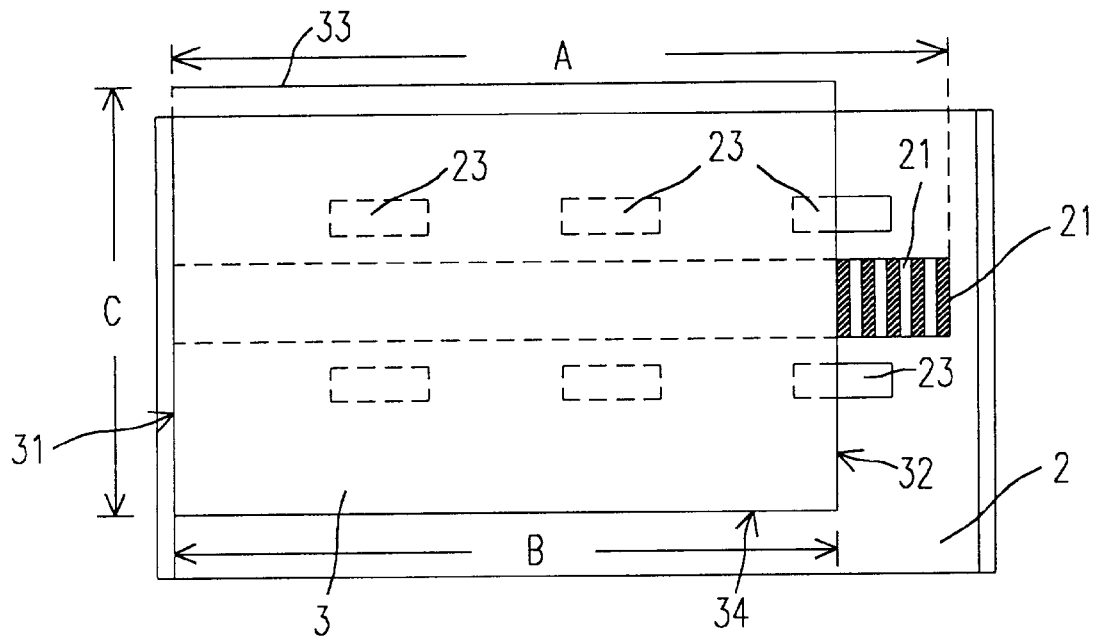
Figure 2D:
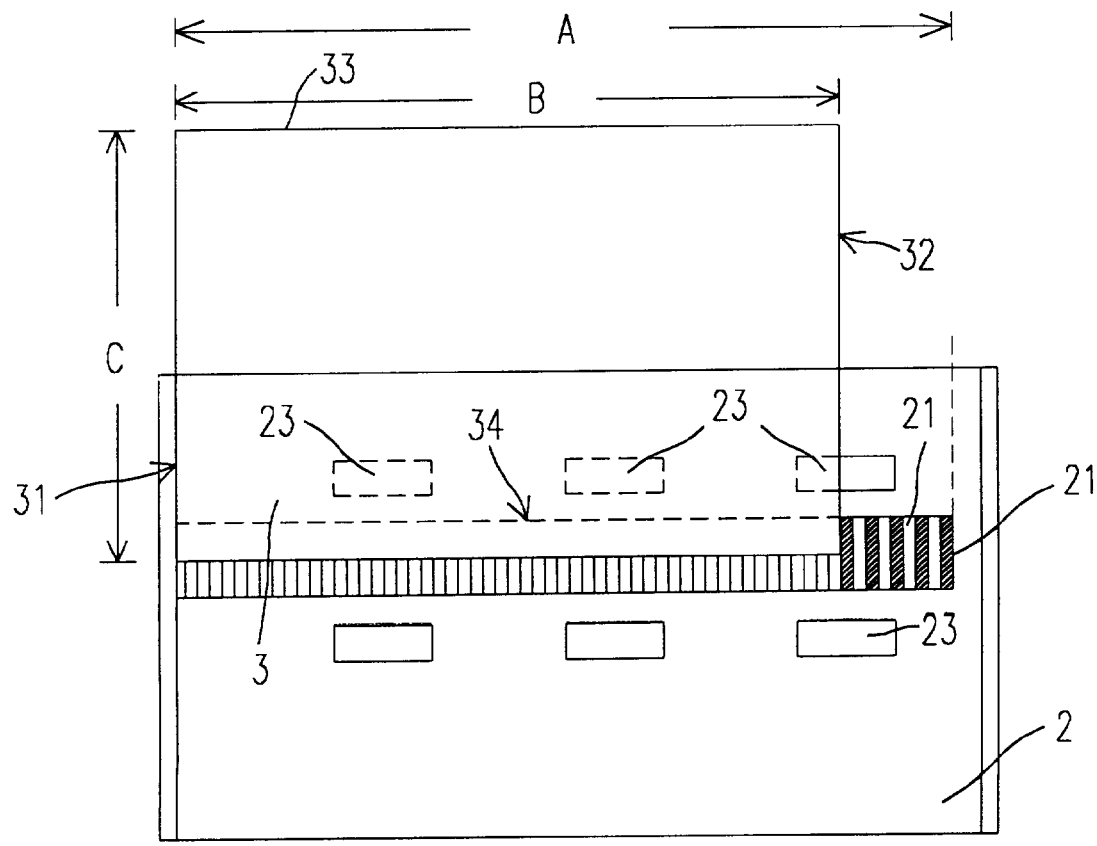
Figure 2E:
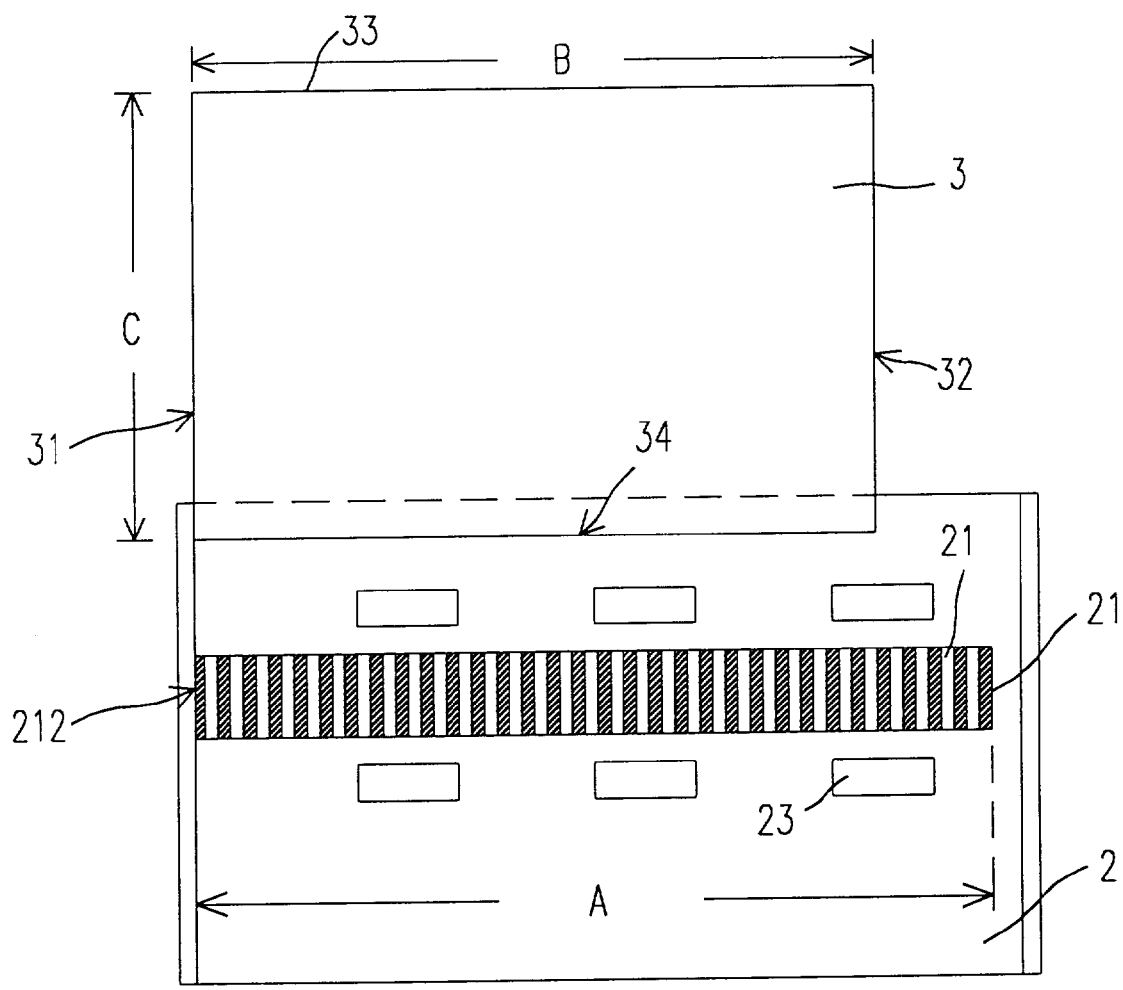
Figure 3A:
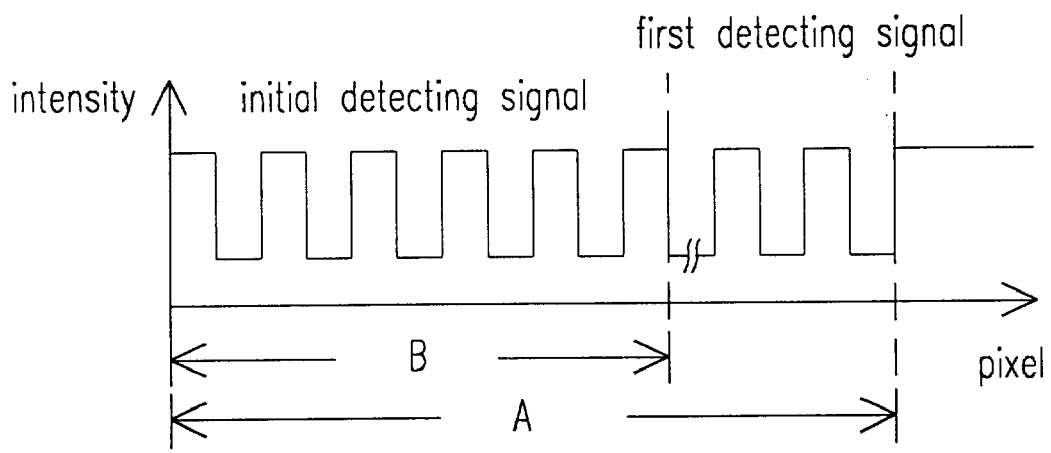
FIGS. 3 (a)–(e) are signal pulse diagrams of the preferred embodiment shown in FIG. 2 according to the present invention.
Figure 3B:
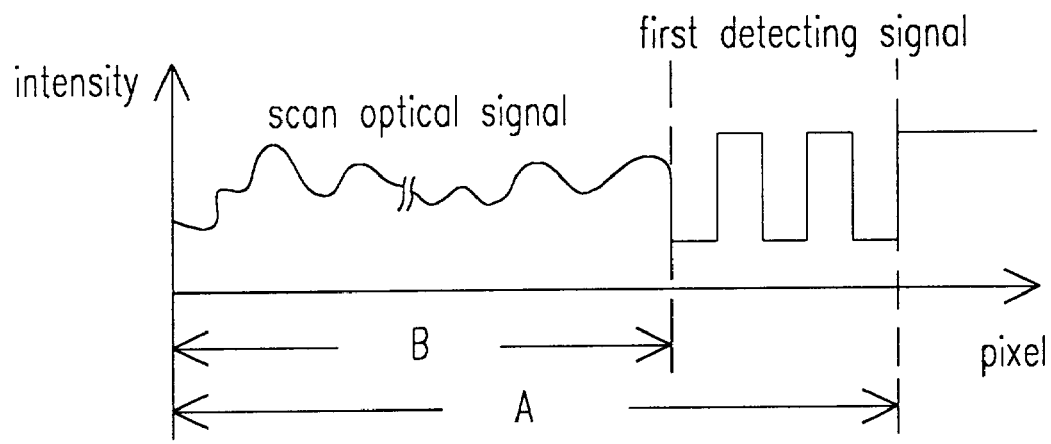
Figure 3C:
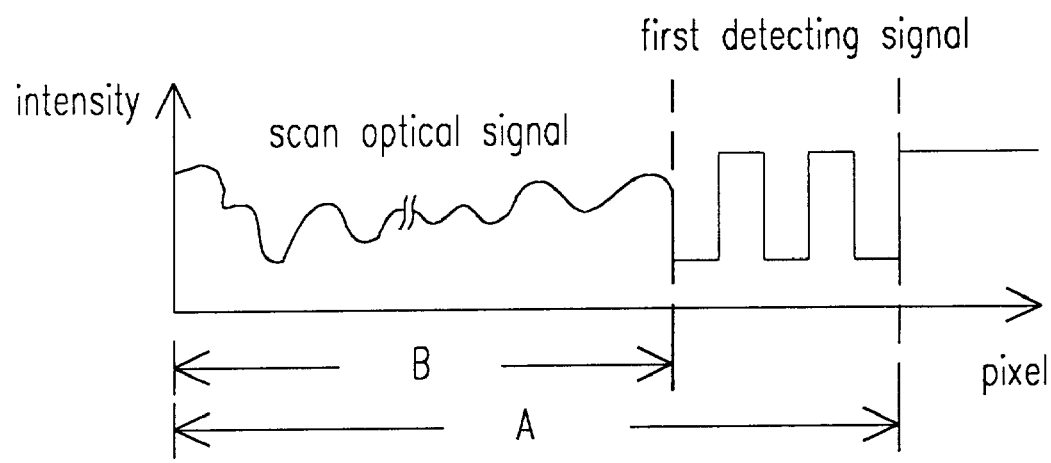
Figure 3D:
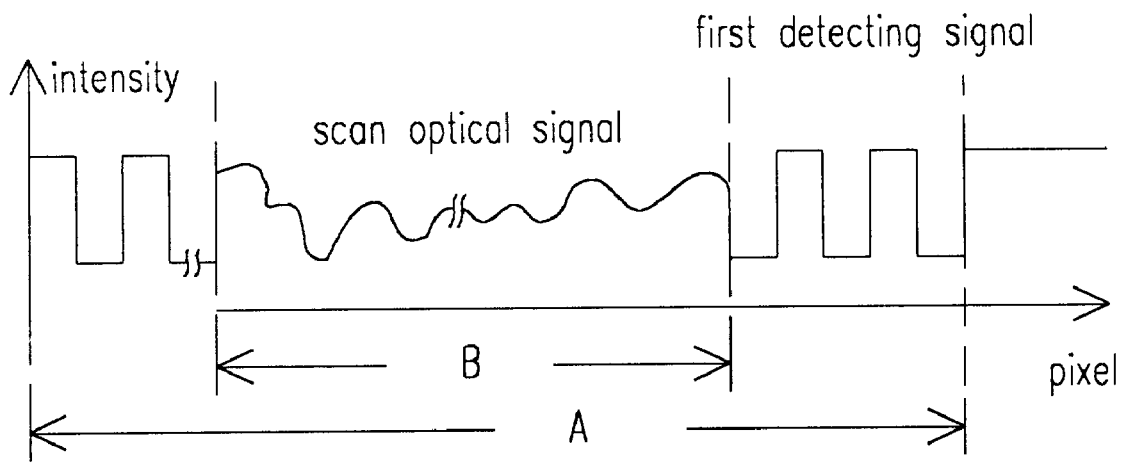
Figure 3E:
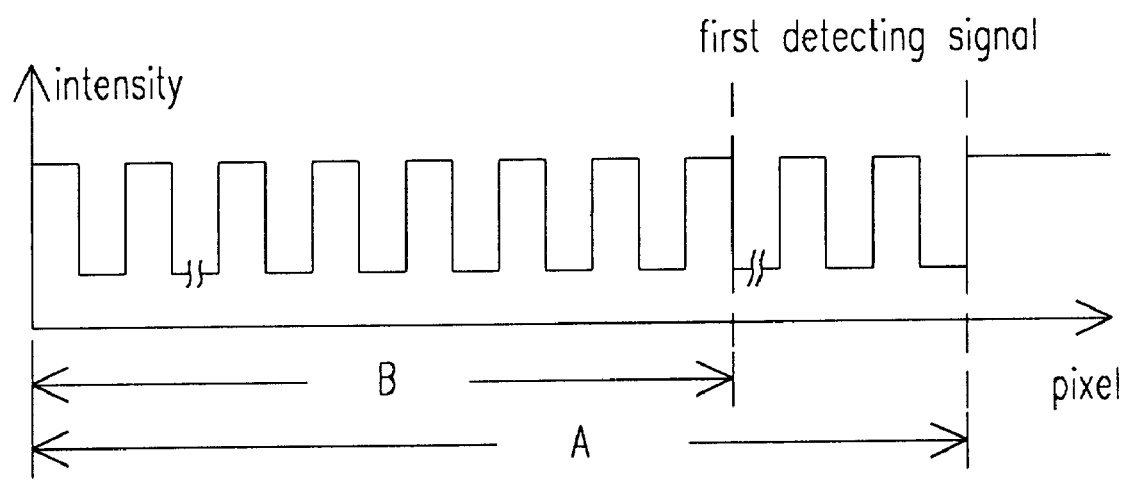

Please refer to FIG. 1 which is a side view of the structure of a sheetfed scanner according to the present invention. The scanner is classified as reflective-mode scanner which includes an upper case 1 and a lower case 2. The detecting unit 21 having a plurality of strias is mounted on the lower case 2. A scanned body, e.g. a piece of paper 3, needs to be scanned and is fed to the scanner. The scanning steps are described as follows. The light source 11 provides the detecting unit 21 with an initial optical signal. The detecting unit 21 receives the initial optical signal and generates an initial detecting signal. If the piece of paper 3 is fed within the light path of the initial optical signal, that is, the piece of paper 3 overlaps the detecting unit 21, both the piece of paper 3 and the detecting unit 21 receive the initial optical signal, and generate a complex detecting signal. The above-described initial detecting signals or the complex detecting signals pass the scanning window 18, and are transmitted to the lens 16 by the light-reflecting unit including reflecting mirrors 12, 13, 14, and 15. Then, the lens 16 focuses the detecting signals on the signal processing unit including a charge coupled device 17, and the detecting signals are converted into voltage level signals. At last, the voltage level signals are converted into image signals by an image processing unit. The image processing unit is a circuit 19 electrically connected to the charge coupled device 17. Certainly, the image processing unit may be a software program which can convert the voltage level signals into the image signals.

FIG. 2 is a schematic diagram which shows a preferred embodiment for determining the width and the length of the scanned body according to the present invention. The piece of paper 3 are fed to the scanner by the rollers 23. The lower case 2 has a fixed bar 22 by which the left boundary 31 of the piece of paper 3 is fed along. The lower case 2 also has a detecting unit 21 having thereon a plurality of strias 211 wherein one end 212 of the detecting unit 21 is in alignment with the fixed bar 22. The length of the detecting unit 21 is a known value A.

The piece of paper 3 with a width B starts to be fed slowly to the scanner. The length A of the detecting unit 21 must be longer than the width B of the piece of paper 3. At first, the light source provides the detecting unit 21 with an initial optical signal. Please refer to FIG. 2(*a*) wherein the upper boundary 33 of the piece of paper 3 has not met the detecting unit 21 yet, so the detecting unit 21 generates an initial detecting signal as shown in FIG. 3(*a*) in response to the initial optical signal. The initial detecting signal is a square wave in accordance with the strias 211. Please refer to FIG. 2(*b*) wherein the upper boundary 33 of the piece of paper 3 just meets the detecting unit 21. Therefore, the upper boundary 33 of the piece of paper 3 overlaps the detecting unit 21 and the right boundary 32 of the piece of paper 3 is in alignment with the stria 2111. A complex detecting signal shown in FIG. 3(*b*) including a scan optical signal and a first detecting signal which is a square wave is generated wherein the former is generated by the upper boundary 33 of the piece of paper 3 while the later is generated by the uncovered part of the detecting unit 21. The meet of the scan optical signal and the first detecting signal exists on the stria 2111, that is, right boundary 32 of the piece of paper 3. Hence, we can define where the right boundary 32 of the piece of paper 3 is on the scanning window by calculating the complex detecting signal to find which pixel the meet occurs on. Then, the width B of the piece of paper 3 is determined. The first specific time when the detected signal changes from the initial detecting signal into the complex detecting signal is recorded.

Please refer to FIG. 2(*c*), half of the piece of paper 3 passes the detecting unit 21. Please refer to FIG. 3(*c*) showing the signal pulse diagram. During the scanning process, the complex detecting signal is converted into a voltage level signal by the charge coupled device. It is easy to distinguish the scan optical signal with the first detecting signal because that the first detecting signal is a square wave. Then, the scan optical signal part of the voltage level signal will be converted into an image signal but the first detecting signal part of the voltage level signal will not. Therefore, the image picture obtained after scanning does not have unwanted margin.

Later, the lower boundary 34 of the piece of paper 3 meets the detecting unit 21. Please refer to FIG. 2(*d*) showing that the lower boundary 34 of the piece of paper 3 overlaps the detecting unit 21. The complex detecting signal shown in FIG. 3(*d*) including the scan optical signal and the first detecting signal is generated in response to the initial optical signal provided by the light source wherein the former is generated by the lower boundary 34 of the piece of paper 3 while the later is generated by the uncovered part of detecting unit 21. Please refer to FIG. 2(*e*). The piece of paper 3 leaves the detecting unit 21 at last, and the scanning process completes. The piece of paper 3 does not overlap the detecting unit 21, so the initial detecting signal is generated again by the detecting unit 21 in response to the initial optical signal provided by the light source. The signal pulse in FIG. 3(*e*) is a square wave which is the same as it in FIG. 3(*a*). The second specific time when the detected signal changes form the complex detecting signal into the initial detecting signal is recorded. The length C of the piece of paper 3 is determined by multiplying the time interval between the second specific time and the above-described first specific time by the rotating speed of the rollers. The rollers are driven by a step motor, so the rotating speed of the rollers can be easily determined.

Figure 4:
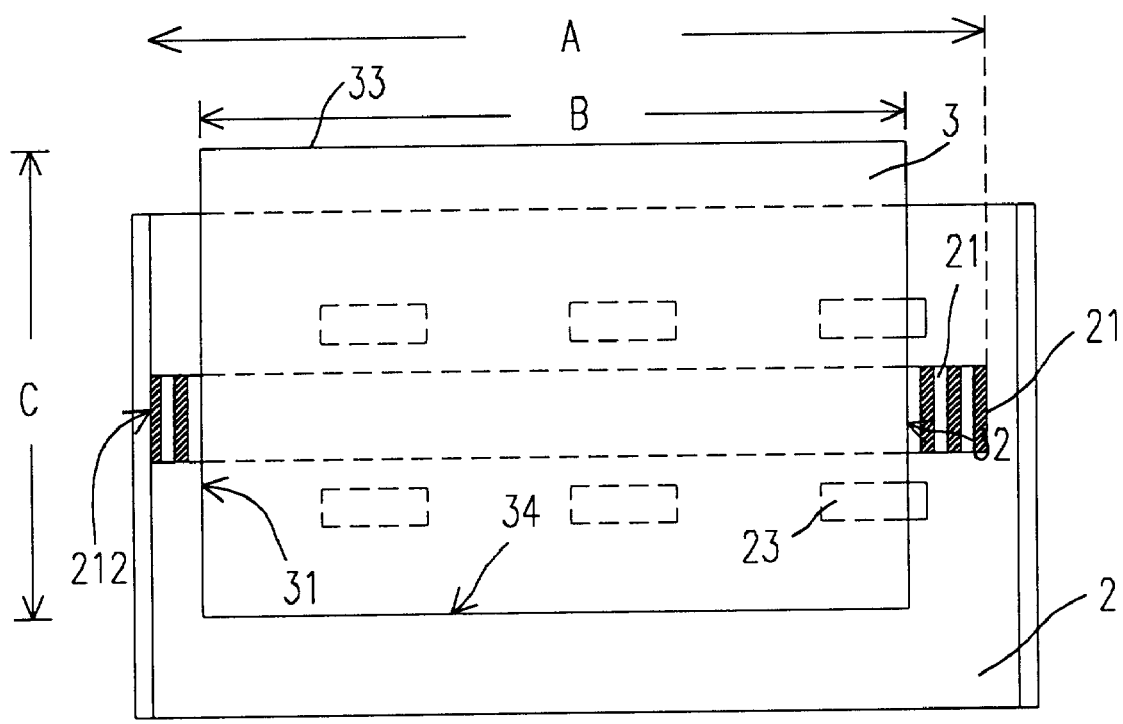
FIG. 4 is a schematic diagram showing another preferred embodiment for determining the width and the length of the scanned body according to the present invention.
Figure 5A:
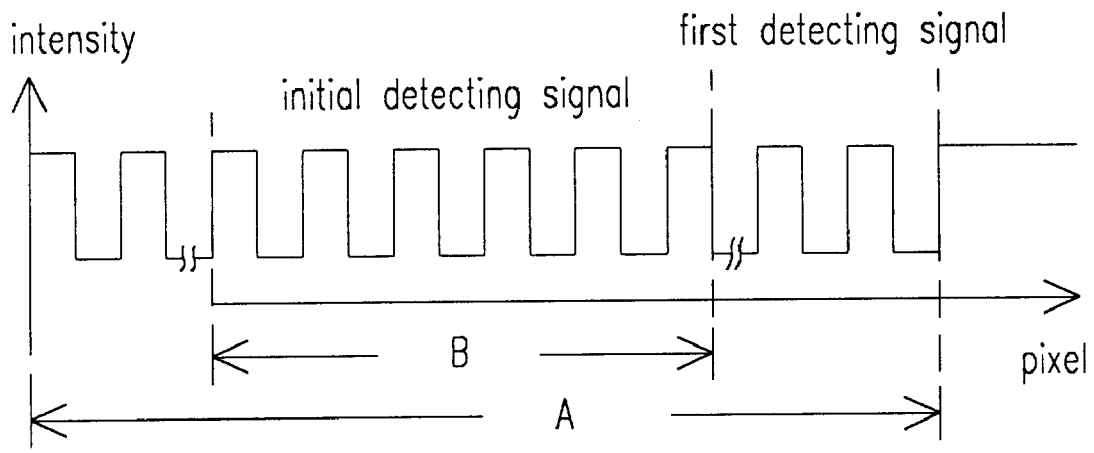
FIGS. 5 (a)–(e) are signal pulse diagrams of the preferred embodiment shown in FIG. 4 according to the present invention.
Figure 5B:
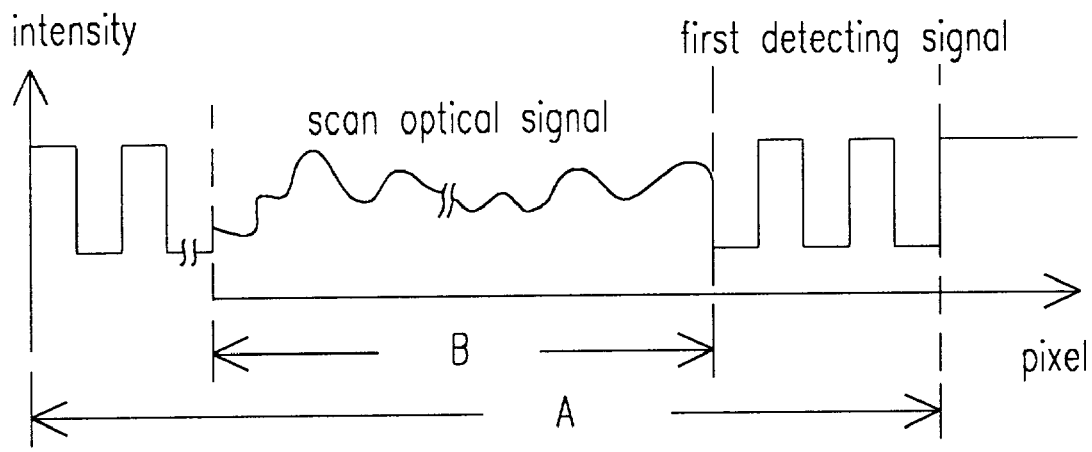
Figure 5C:
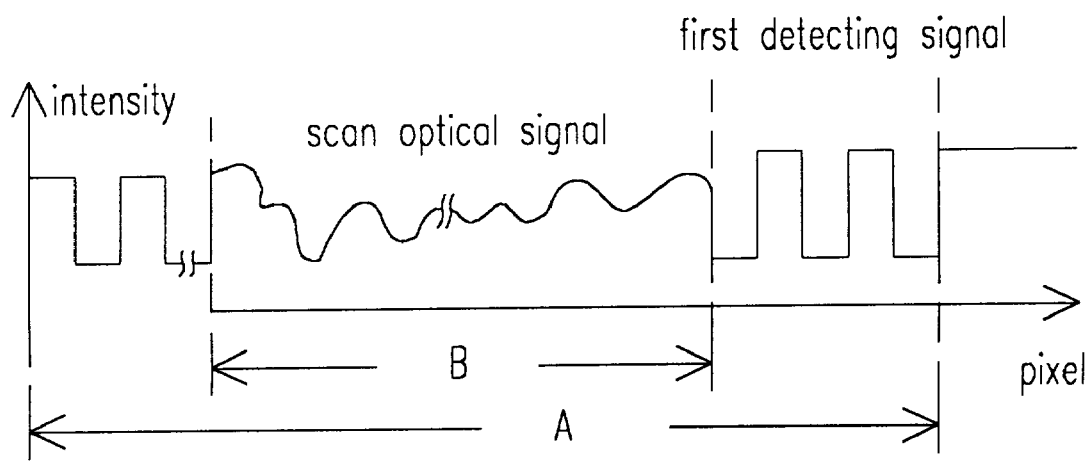
Figure 5D:
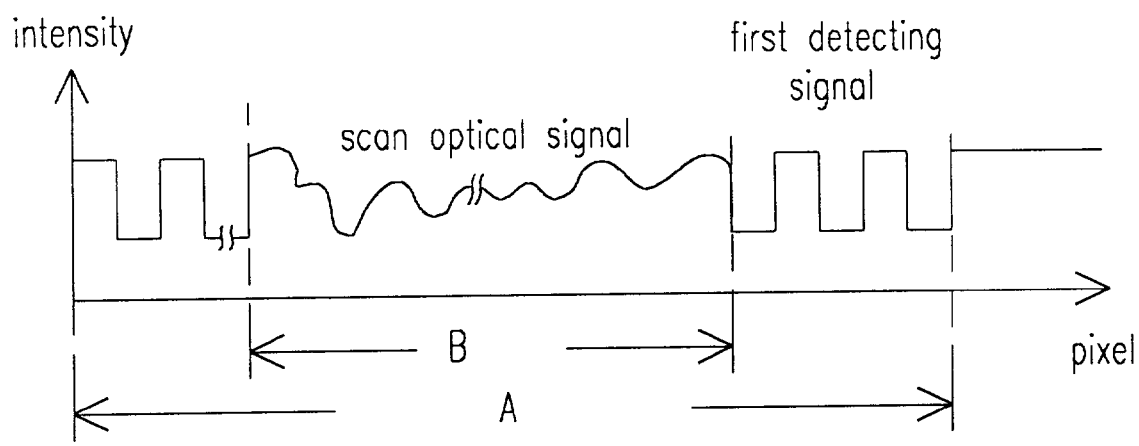
Figure 5E:
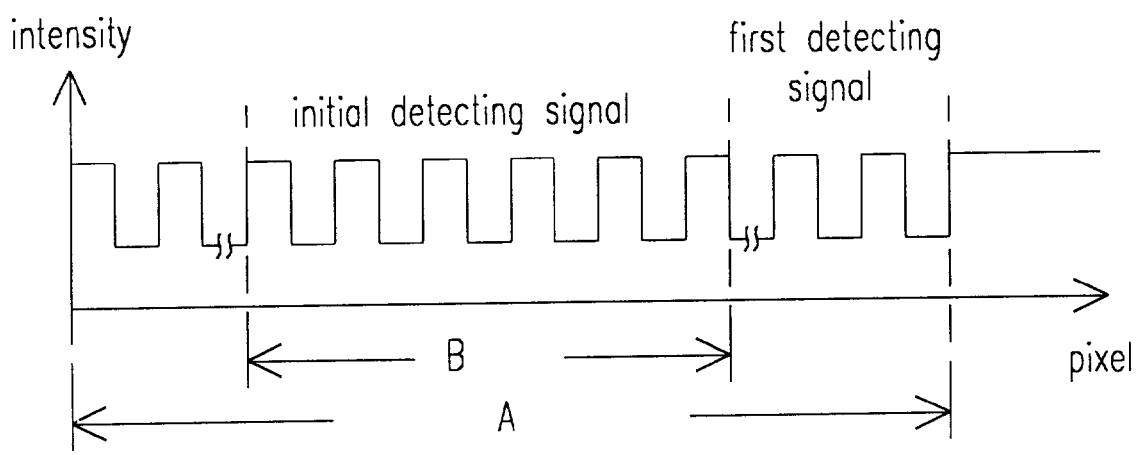

Please refer to FIG. 4 which is another preferred embodiment for determining the width and the length of the scanned body according to the present invention. The method for determining the width B and the length C of the piece of paper 3 is similar to the first preferred embodiment. The detecting unit 21 with a known length A must be longer than the width B of the piece of paper 3. There are many strias 211 on the detecting unit 21. The piece of paper 3 is fed to the scanner, but it is not necessary for the left boundary 31 of the piece of paper 3 to be in alignment with the end 212 of the detecting unit 2. Please refer to FIG. 5(*a*), the initial detecting signal which is a square wave is detected before the piece of paper reaches the detecting unit 21. When the upper boundary 33 of the piece of paper 3 meets the detecting unit 21, a complex detecting signal is detected. The left boundary 31 and the right boundary 32 of the piece of paper 3 are in alignment with the strias 2112 and 2111, respectively. So the scan optical signal generated by the piece of paper 3 is at the middle of the complex detecting signal while the first detecting signal is at the two sides of the complex detecting signal. The signal pulse diagram is shown in 5(*b*). The meets of the scan optical signal and the first detecting signal exist on the stria 2112 and 2111, that is, left boundary 31 and the right boundary 32 of the piece of paper 3. Hence, we can define where the left boundary 31 and the right boundary 32 of the piece of paper 3 are on the scanning window by calculating the complex detecting signal to find which pixels the meets occur on. Then, the width B of the piece of paper 3 is determined. The first specific time when the detected signal changes from the initial detecting signal into the complex detecting signal is recorded.

Later, a portion of the piece of paper 3 passes the detecting unit 21. The signal pulse diagram is shown in FIG. 5(*c*). During the scanning process, the complex detecting signal is converted into a voltage level signal by the charge coupled device. The scan optical signal part of the voltage level signal is converted into an image signal but the first detecting signal part of the voltage level signal, that is, the square wave is not. Therefore, the image obtained after scanning does not have unwanted margin.

Later, the lower boundary 34 of the piece of paper 3 meets the detecting unit 21. The complex detecting signal shown in FIG. 5(d) including the scan optical signal and the first detecting signal is detected wherein the former is generated by the lower boundary 34 of the piece of paper 3 while the later is generated by the uncovered part of detecting unit 21. At last, the piece of paper 3 leaves the detecting unit 21 and the scanning process completes. Please refer to FIG. 5(e). The initial detecting signal is detected again. The second specific time when the detected signal changes form the complex detecting signal into the initial detecting signal is recorded. The length C of the piece of paper 3 is determined by multiplying the time interval between the second specific time and the above-described first specific time by the rotating speed of the rollers driven by a step motor.

Figure 6:
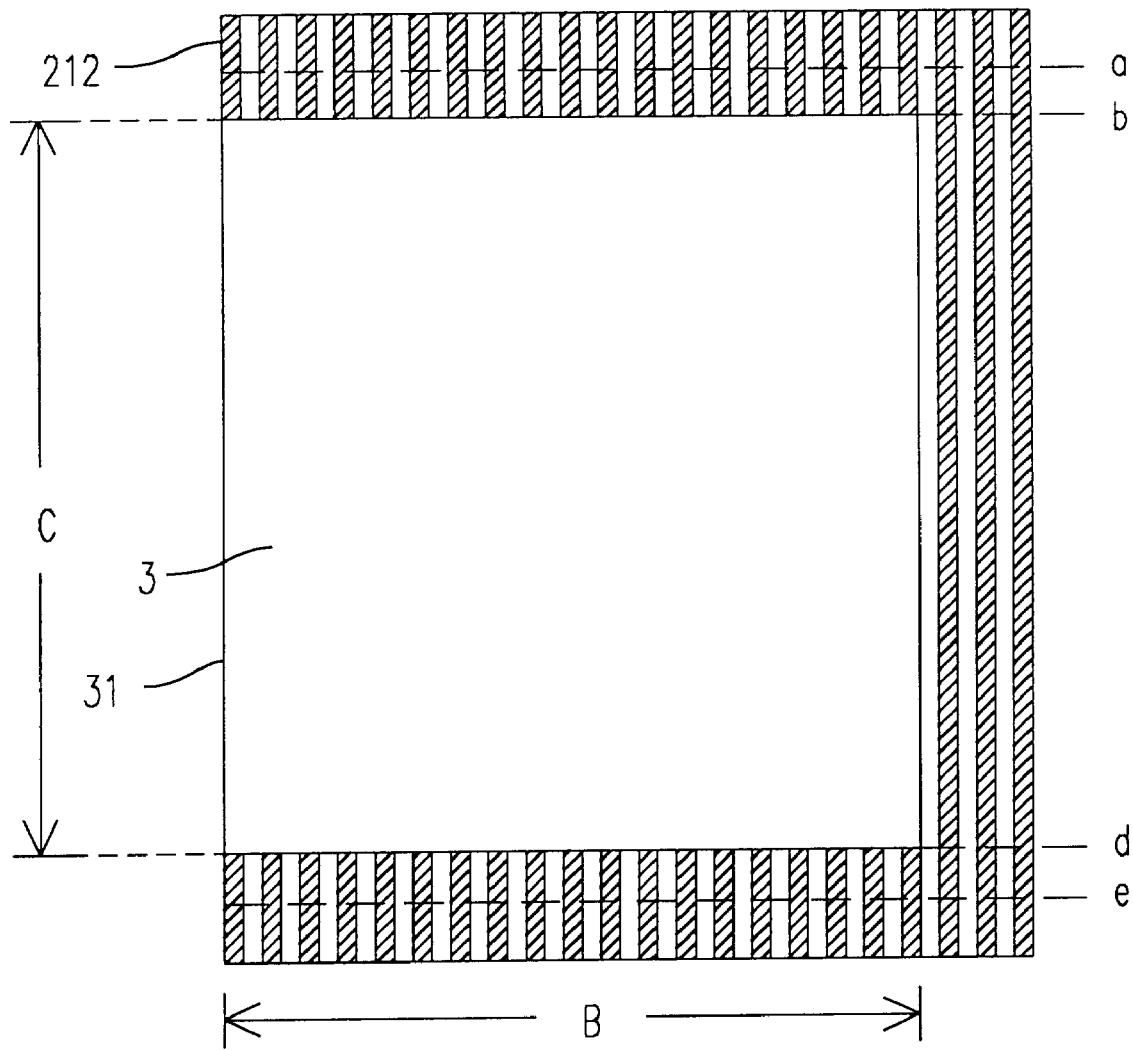
FIG. 6 is a schematic diagram showing the third preferred embodiment for determining the width and the length of the scanned body according to the present invention.

Please refer to FIG. 6 which is a third preferred embodiment for determining the width and the length of the scanned body. The method applied to a flatbed scanner for determining the width B and the length C is similar to the prior two preferred embodiments. Since the piece of paper 3 keeps immobile on the scanning window, the light source must move to provide the initial optical signal for the whole piece of paper 3. The size of the detecting unit 21 is larger than the piece of paper 3 and the left boundary 31 of the piece of paper is in alignment with the end 212 of the detecting unit 21. The signal pulse diagram of this preferred embodiment is the same as shown in FIG. 3. At first, the initial optical signal is provided for the position a, and the initial detecting signal which is a square wave is detected. Secondly, the initial optical signal is provided for the position b, and the complex detecting signal including scan optical signal and first detecting signal is detected. According to the complex detecting signal, the width B of the piece of paper 3 can be determined by finding out which pixel the scan optical signal meets the first detecting signal. The first specific time when the detected signal changes from the initial detecting signal into the complex detecting signal is recorded. Thirdly, the initial optical signal is provided for the position d, and the complex detecting signal is still detected. The scan optical signals generated during the time interval when the initial optical signal is provided successively for each of the positions b through d are converted to image signals. At last, the initial optical signal is provided for the position e, and the initial detecting signal is detected again. The second specific time when the detected signal changes from the complex detecting signal into the initial detecting signal is reordered. The length C of the piece of paper 3 can be determined by multiplying the time interval between the first specific time and the second specific time by the moving speed of the light source.

Figure 7:
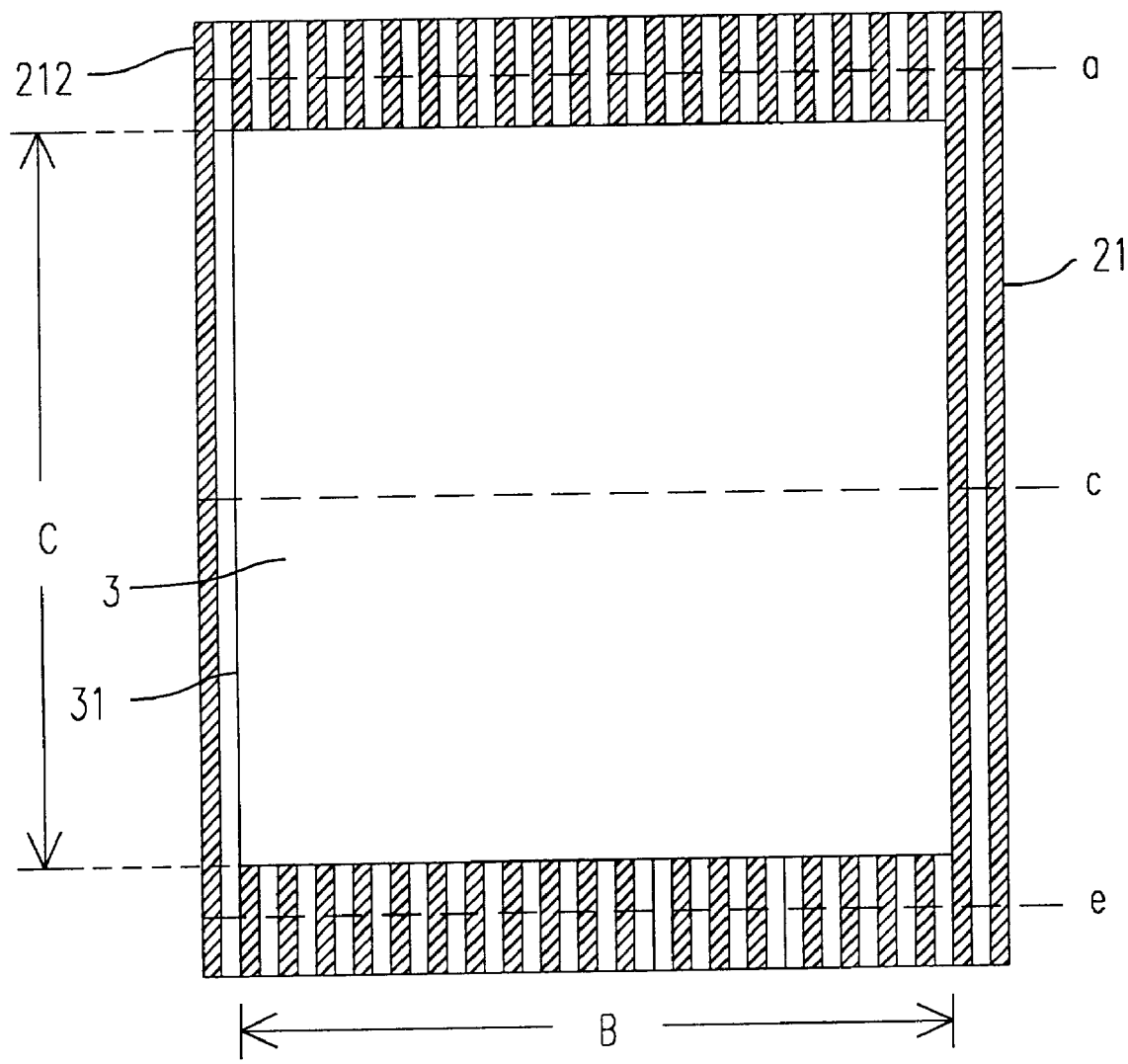
FIG. 7 is a schematic diagram showing the fourth preferred embodiment for determining the width and the length of the scanned body according to the present invention.

Please refer to FIG. 7 which is a fourth preferred embodiment for determining the width and the length of the scanned body according to the present invention. The method applied to a flatbed scanner for determining the width B and the length C of the piece of paper 3 is similar to the prior preferred embodiments. Since the piece of paper 3 keeps immobile on the scanning window, the light source must move to provide the initial optical signal for the whole piece of paper 3. The size of the detecting unit 21 is larger than the piece of paper 3, but it is not necessary for the left boundary 31 of the piece of paper 3 to be in alignment with the end 212 of the detecting unit 21. The signal pulse diagram of this preferred embodiment is the same as that shown in FIG. 5. At first, the initial optical signal is provided for the detecting unit 21 at position a, and the initial detecting signal is detected. Secondly, the initial optical signal is provided for the piece of paper 3 at position c and the detecting unit 21, and the complex detecting signal including scan optical signal and first detecting signal is detected wherein the scan optical signal is at the middle of the complex detecting signal while the first detecting signal is at two sides of the complex detecting signal. According to the complex detecting signal, the width B of the piece of paper 3 can be determined by finding out which pixels the scan optical signal meets the first detecting signal. The first specific time when the detected signal changes from the initial detecting signal into the complex detecting signal is recorded. At last, the initial optical signal is provided for the detecting unit at position e, and the initial detecting signal is detected again. The second specific time when the detected signal changes from the complex detecting signal into the initial detecting signal is recorded. The length C of the piece of paper 3 can be determined by multiplying the time interval between the first specific time and the second specific time by the moving speed of the light source.

In conclusion, a new method and device for determining the width and the length of the scanned body are demonstrated and disclosed. The advantages, namely, the reasonable design of the structure, the easy production and installation, and the automatic function for determining the dimension of the scanned body, make this method and device utilizable and valuable.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for determining a scanning dimension of a scanned body by calculating a distance between a first width boundary and a second opposite width boundary of said scanned body, comprising:

a light source for providing an initial optical signal;

a lower case for supporting said scanned body thereon, said lower case including a detecting unit having a plurality of striae thereon arranged in a band for generating an initial detecting signal in response to said initial optical signal and generating a complex detecting signal according to said scanning dimension of said scanned body, a plurality of rollers for gradually feeding said scanned body onto said lower case through said band of striae, and a fixed bar mounted on an end of said detecting unit for aligning said width boundaries of said scanned body parallel with said plurality of striae of said detecting unit, wherein said first width boundary of said scanned body is in alignment with a first specific one of said striae and said second opposite width boundary of said scanned body is in alignment with a second specific one of said striae; and a signal processing unit for determining said scanning dimension of said scanned body by calculating said initial detecting signal and said complex detecting signal according to said first specific one and said second specific one of said striae of said detecting unit.

2. A device according to claim 1 wherein said detecting unit is mounted in a light path of said initial optical signal.

3. A device according to claim 1 further comprising a light-reflecting unit for changing light paths for said initial detecting signal and said complex detecting signal.

4. A device according to claim 1 wherein said signal processing unit further includes a charge coupled device for converting said initial detecting signal and said complex detecting signal into voltage level signals.

5. A device according to claim 4, further comprising an image processing unit electrically connected to said charge coupled device for converting said voltage level signals into an image signal.

6. A device according to claim 5 wherein said image processing unit is a circuit.

7. A device according to claim 5 wherein said image processing unit is a software program.

8. A device according to claim 1 wherein said complex detecting signal includes a first detecting signal and a scan optical signal, wherein said first detecting signal and said scan optical are outputted from said detecting unit and said scanned body respectively after said initial optical signal is received.

9. A device for determining a scanning dimension of a scanned body by calculating a distance between a first width boundary and a second opposite width boundary of said scanned body, comprising:

a light source for providing an initial optical signal;

a lower case for supporting said scanned body thereon, said lower case including a detecting unit having a stripy pattern thereon arranged in a band for generating an initial detecting signal in response to said initial optical signal and generating a complex detecting signal according to said scanning dimension of said scanned body, a plurality of rollers for gradually feeding said scanned body onto said lower case through said band of striae, and a fixed bar mounted on an end of said detecting unit for aligning said width boundaries of said scanned body parallel with said stripy pattern striae of said detecting unit, wherein said first width boundary of said scanned body is in alignment with a first specific one of said stripy pattern and said second opposite width boundary of said scanned body is in alignment with a second specific one of said stripy pattern; and a signal processing unit for determining said scanning dimension of said scanned body by calculating said initial detecting signal and said complex detecting signal according to said first specific one and said second specific one of said stripy pattern of said detecting unit.

10. A device for determining a scanning dimension of a scanned body by calculating a distance between a first width boundary and a second opposite width boundary of said scanned body, comprising:

a light source for providing an initial optical signal;

a lower case for supporting said scanned body thereon, said lower case including a detecting unit having a grating pattern thereon arranged in a band for generating an initial detecting signal in response to said initial optical signal and generating a complex detecting signal according to said scanning dimension of said scanned body, a plurality of rollers for gradually feeding said scanned body onto said lower case through said band of striae, and a fixed bar mounted on an end of said detecting unit for aligning said width boundaries of said scanned body parallel with said grating pattern of said detecting unit, wherein said first width boundary of said scanned body is in alignment with a first specific one of said grating pattern and said second opposite width boundary of said scanned body is in alignment with a second specific one of said grating pattern; and a signal processing unit for determining said scanning dimension of said scanned body by calculating said initial detecting signal and said complex detecting signal according to said first specific one and said second specific one of said grating pattern of said detecting unit.

\* \* \* \* \*